US010673521B1

(12) United States Patent
Beauvilliers

(10) Patent No.: US 10,673,521 B1
(45) Date of Patent: Jun. 2, 2020

(54) RESILIENT VIRTUAL GROUND MULTIPLE ACCESS

(71) Applicant: LOCKHEED MARTIN CORPORATION, Bethesda, MD (US)

(72) Inventor: Paul E. Beauvilliers, Phoenixville, PA (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 0 days.

(21) Appl. No.: 16/368,643

(22) Filed: Mar. 28, 2019

(51) Int. Cl.
*H04B 7/185* (2006.01)

(52) U.S. Cl.
CPC ..... *H04B 7/18517* (2013.01); *H04B 7/18513* (2013.01); *H04B 7/18519* (2013.01)

(58) Field of Classification Search
CPC .......................... H04B 7/185; H04B 7/18517
See application file for complete search history.

(56) References Cited

U.S. PATENT DOCUMENTS

| 5,319,673 | A | * | 6/1994 | Briskman | H04H 40/90 455/13.1 |
|---|---|---|---|---|---|
| 5,995,043 | A | * | 11/1999 | Murphy | G01S 5/009 342/357.48 |
| 6,600,730 | B1 | * | 7/2003 | Davis | H04B 7/18517 370/343 |
| 2014/0266872 | A1 | * | 9/2014 | Mitola, III | H04B 7/195 342/356 |

* cited by examiner

*Primary Examiner* — Hsinchun Liao
(74) *Attorney, Agent, or Firm* — Morgan, Lewis & Bockius LLP

(57) ABSTRACT

A resilient virtual ground multiple-access (RVG-MA) satellite communication system includes a number of ground receivers in communication with multiple satellites. The RVG-MA satellite communication system further includes a number of processing units in communication with the ground receivers. Each processing unit can recover a downlink signal from a target satellite. Each ground receiver includes a small-aperture antenna and receives downlink signals associated with multiple satellites, and the ground receivers are distributed over a large geographic area.

20 Claims, 4 Drawing Sheets

RESILIENT VIRTUAL GROUND MULTIPLE ACCESS

STATEMENT REGARDING FEDERALLY SPONSORED RESEARCH OR DEVELOPMENT

Not applicable

FIELD OF THE INVENTION

The present invention generally relates to satellite communications, and more particularly to resilient virtual ground multiple-access support.

BACKGROUND

Space-based systems may work with ground stations for communication of command and control, telemetry, and mission data. Oftentimes there are multiple ground stations used as part of the same system to provide increased access or contact time. These ground stations are typically self-contained, meaning that each station independently closes the communications link. Resilient virtual ground (RVG) is a network of receivers that may be used to increase the channel capacity of space-to-ground communications links. An RVG system may leverage the proliferation of terrestrial mobile infrastructure, broadband access and cloud computing to decrease cost of deployment and implementation. Within an RVG system, receivers are distributed across a deployment area. Within the deployment area, receivers may be tuned to the same radio frequency (RF) band and multiple receivers may be simultaneously in the satellite transmit beam. The RVG increases channel capacity by coherent combination of the receivers that are simultaneously in the satellite transmit beam. A single RVG receiver may not need to independently close the communications link with the satellite. Receiver locations are spatially diverse so that RVG is inherently resilient and hard to jam.

Terrestrial communication service towers (e.g., mobile towers) are excellent potential site locations due to their spatial distribution and existing infrastructure, which includes power and connectivity to the Internet. Communications service tower sites often lease tower space and resources. It is envisioned that an RVG system would proliferate low-cost radios wherever available infrastructure exists. The notion of ground site link, contact, and availability within an RVG is different than with a traditional satellite ground station.

SUMMARY

According to various aspects of the subject technology, methods and configuration for leveraging resilient virtual ground (RVG) concept for multiple-access support are provided. In some aspects, the subject technology enables the use of a large number of low-cost small-aperture ground terminals and recovering downlink messages by employing a signal-combining technology.

In some other aspects, an RVG multiple-access (RVG-MA) satellite communication system includes a number of ground receivers in communication with multiple satellites. The RVG-MA satellite communication system further includes a number of processing units in communication with the ground receivers. Each processing unit can recover a downlink signal from a target satellite. Each ground receiver includes a small-aperture antenna and receives downlink signals associated with multiple satellites, and the ground receivers are distributed over a large geographic area.

In other aspects, a method of satellite communication includes receiving, via a number of ground receivers, signals from multiple satellites. The method further includes processing, via a number of processing units, the signals from the satellites to recover, by each processing unit, a downlink signal associated with a target satellite. The ground receivers are scattered over a large geographic area.

In yet other aspects, a satellite communication system includes a number of satellite transmitters, a number of ground terminals, multiple combiner nodes, multiple data demodulator nodes, and a number of receivers. Each ground terminal can receive downlink signals from multiple satellite transmitters. Each combiner node receives downlink signals from the ground terminals and aggregates the received downlink signals. The demodulator nodes can recover downlink signals associated with a target satellite transmitter. The receivers are in communication with a respective data demodulator node, and each receiver receives the downlink signals associated with the target satellite from the respective data demodulator node.

The foregoing has outlined rather broadly the features of the present disclosure in order for the detailed description that follows to be better understood. Additional features and advantages of the disclosure will be described hereinafter, which form the subject of the claims.

BRIEF DESCRIPTION OF THE DRAWINGS

For a more complete understanding of the present disclosure, and the advantages thereof, reference is now made to the following descriptions to be taken in conjunction with the accompanying drawings describing specific aspects of the disclosure, wherein.

DETAILED DESCRIPTION

Figure 1:
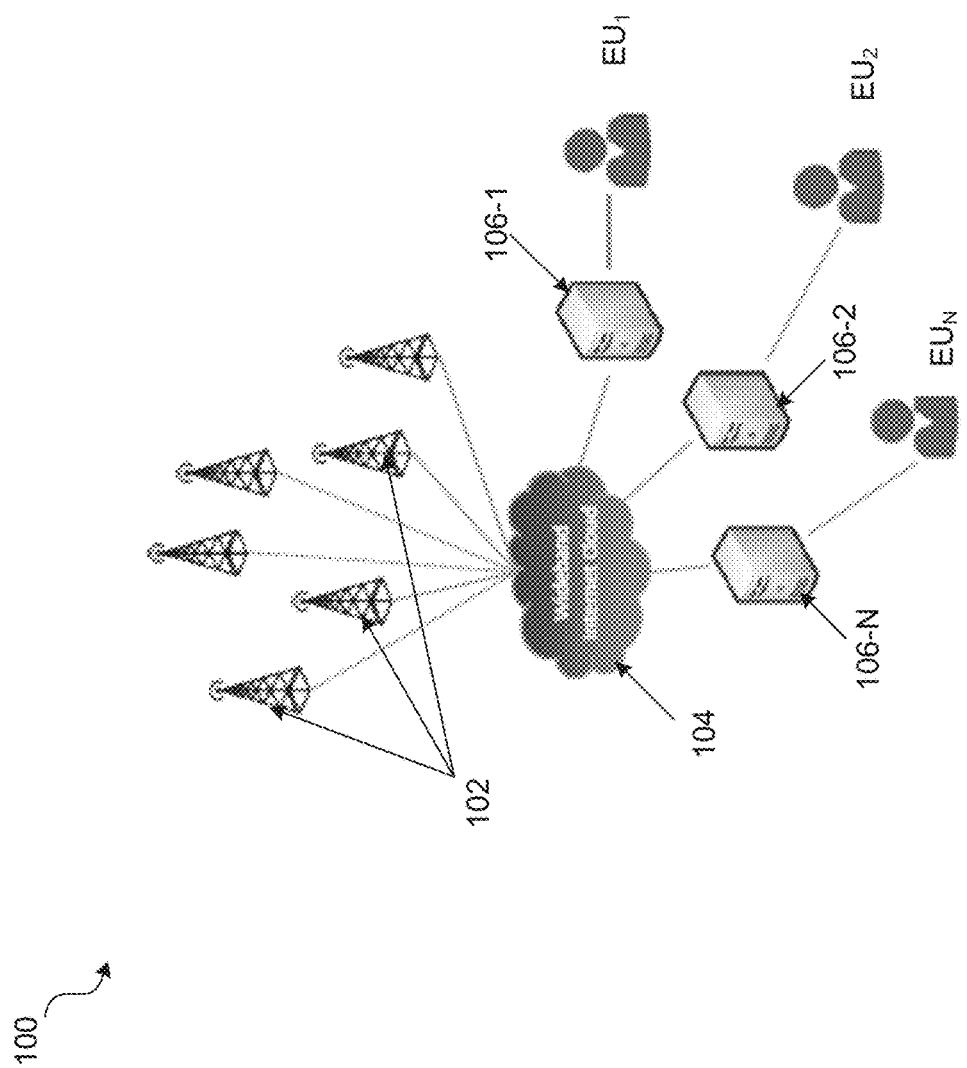
FIG. 1 is a high-level diagram illustrating an example of a resilient virtual ground (RVG) system with multiple access (MA), according to certain aspects of the disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and can be practiced using one or more implementations. In one or more instances, well-known structures and components are shown in block diagram form in order to avoid obscuring the concepts of the subject technology.

The present disclosure is directed, in part, to systems and configurations for leveraging the resilient virtual ground (RVG) concept to support multiple access (MA). The RVG concept is described in the U.S. patent application Ser. No. 15/594,511 filed May 12, 2017, which is incorporated by reference herein. The RVG-MA concept introduced herein is a satellite-to-ground communication system employing a number of geographically disperse, low-cost ground terminals along with a signal-combining strategy, to recover downlink messages associated with a satellite. The subject technology leverages that infrastructure to support the multiple-access concept, whereby the downlink messages associated with several independent satellites are recovered simultaneously. In some aspects, the disclosed technology enables an economy of scale by simultaneously recovering the downlink messages of several satellites while employing a common ground-terminal infrastructure. The existing solutions address the problem of global satellite downlink message recovery via instantiation of a number of independent, large-aperture, high-cost ground-terminal systems distributed across the globe.

The advent of ubiquitous, high-speed ground communications via the Internet, along with the RVG-MA signal-combiner concept, enabled by high-speed computing, supports a new paradigm in the recovery of satellite downlink messaging. The disclosed solution leverages the low-cost ground-terminal infrastructure, and augments the infrastructure with multiple instantiations of signal recombination units. Each unit can be tuned to recover the downlink messages of a particular target satellite. By employing a common ground-terminal infrastructure including multiple individual small-aperture, low-cost terminals, significant savings in the total system of systems cost can be achieved.

It is noted that ground-based recovery of messages from satellites such as low-Earth-orbiting (LEO) satellites can be a costly undertaking. Historically, each new system required custom development and implementation of a ground-support system. It is understood that providing low-latency, high data-rate global coverage requires multiple large-aperture ground terminals, which is costly and involves long development schedules. The subject technology, based on proliferation of LEO satellites, presents opportunity for a communications service provider to relieve satellite operators from the burden of ground communication system development by creating an aggregated system capable of supporting many satellite-to-ground communication links. This is analogous to a common telephone system that provides communication service to many end users. The subject technology relieves the end user from a number of costly tasks such as operating a number of geographically diverse, large-aperture ground stations, operating some combination of highly elliptical orbit (HEO) and/or geosynchronous orbit (GSO) relay satellites and/or cross-link networking of a multitude of LEO satellites. The expense and time involved in implementing any of the above solutions is beyond the means of upcoming generations of low-budget, quick-turn satellite missions. The disclosed RVG-MA can be considered as a potential solution to satellite access for the masses.

FIG. 1 is a high-level diagram illustrating an example of a resilient virtual ground (RVG) system 100 with MA, according to certain aspects of the disclosure. The RVG system 100 includes a number of ground terminals 102 coupled to a number of servers 106 (106-1, 106-2 . . . 106-N) via a network 104. The ground terminals 102 are small-aperture antenna ground receivers. Each ground terminal 102 is in communication with a number of satellites, such as LEO satellites. The network 104 can be a wideband internet cloud, the Internet, or any other network. The number N of servers 106 is equal to the number of satellites. Examples of servers 106 include any electronic system with communications (e.g., wireless communications) and computational resources (e.g., a processing unit).

In some implementations, the processing unit of the server 106 can include a combiner module and a data demodulator (DD) module. The combiner module, also referred to as a combiner node, is a coherent combining processor, and includes suitable circuitry and/or code that may be operable to aggregate downlink signals acquired by multiple ground terminals and to generate an aggregated downlink signal that is a superposition of the downlink signals collected by a number of ground terminals. The DD module can include suitable circuitry and/or code that may be operable to demodulate the aggregated downlink signal and to recover the downlink signal associated with a desired target satellite. The downlink signal associated with the target satellite is in a format that is usable by end users and is provided to end-user groups represented by one of $EU_1$, $EU_2$ . . . $EU_N$. In other words, each end-user group (e.g., $EU_1$) that may include thousands of end users can receive the downlink signal associated with a particular satellite (target satellite).

Figure 2:
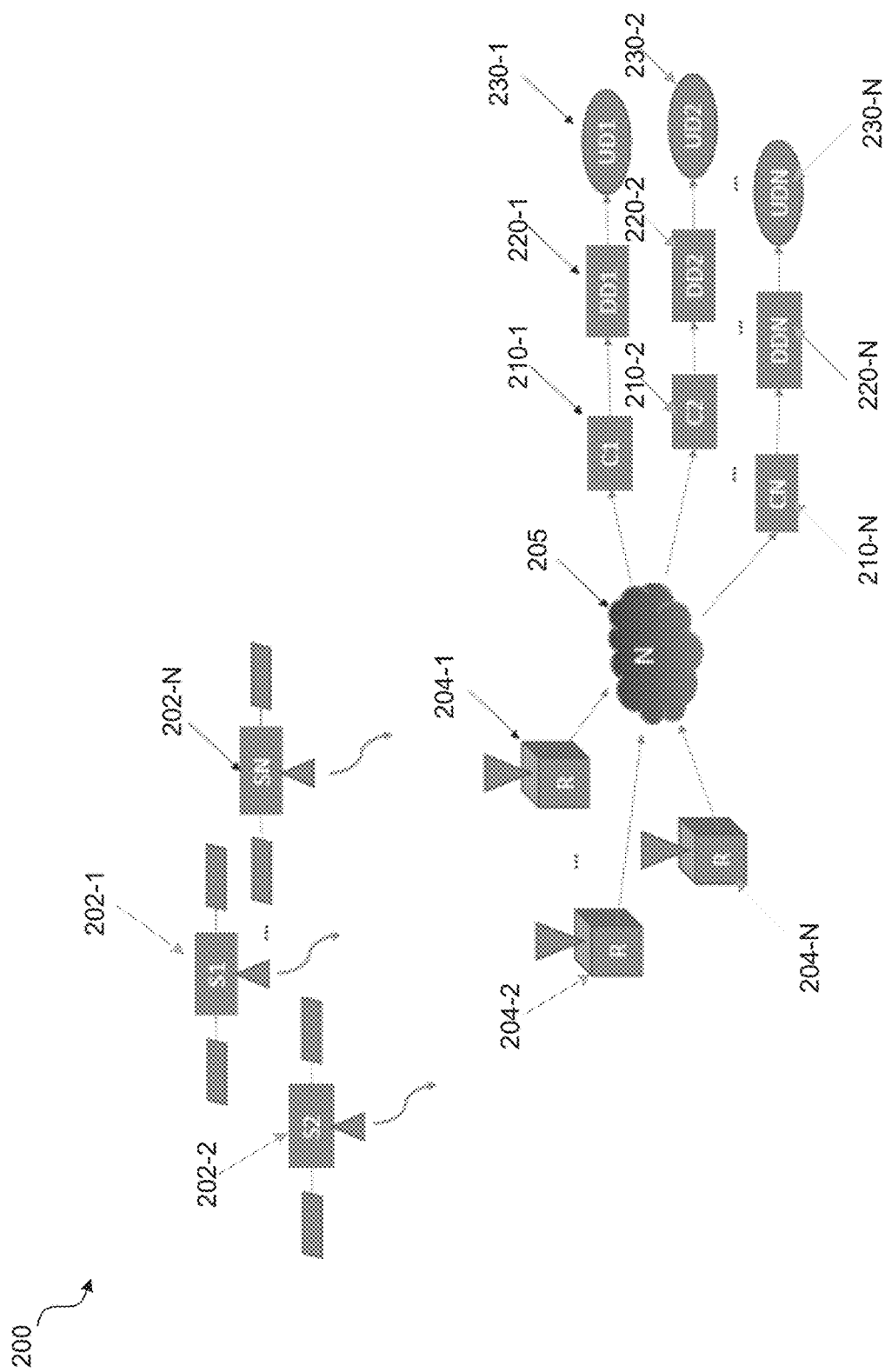
FIG. 2 is a block diagram illustrating an example of an RVG-MA system, according to certain aspects of the disclosure.

FIG. 2 is a block diagram illustrating an example of an RVG-MA system 200, according to certain aspects of the disclosure. The RVG-MA system 200 includes a number of spacecraft such as satellite transmitters 202 (202-1, 202-2 . . . 202-N), a number of ground receivers 204 (204-1, 204-2 . . . 204-N), a network 205, combiner nodes 210 (210-1, 210-2 . . . 210-N), DD modules 220 (220-1, 220-2 . . . 220-N), and user data (UD) stream 230 (230-1, 230-2 . . . 230-N). The satellite transmitters 202 (hereinafter, satellites 202) can be, but are not limited to, LEO satellites. The satellite 202 may collect various terrestrial data (e.g., images), such as meteorological, environmental, geological, geographical, and other data of interest to various users such as organizations, companies, research centers, universities and other interested entities. The satellites 202 may add (e.g., inject) RVG synch-channel (e.g., including training bits) into the collected data and transmit the collected data and a synch-channel bit stream to the ground receivers 204. In some implementations, the ground receivers 204 are small-aperture antenna ground receivers with aperture sizes within a range of about 10 cm-200 cm, and therefore are compact and low-cost receivers. This allows deployment of thousands of them scattered over a large geographic area, for example, in one or more countries or one or more continents or even over the entire Earth surface.

In one or more implementations, each of ground receivers 204 can receive the collected data in an entire bandwidth, depending on the bandwidth and the capabilities of the ground receivers 204. The ground receivers 204 may be coupled to each other via the network 205. The network 205 can be a wideband internet cloud, the Internet or any other network. For example, the network 205 can be a backhaul wireless or wired network such as any of a personal area network (PAN), a local area network (LAN), a campus area network (CAN), a metropolitan area network (MAN), a wide area network (WAN), a broadband network (BBN), and the like. Further, the network 205 can include, but is not limited to, any one or more of the following network topologies, including a bus network, a star network, a ring network, a mesh network, a star-bus network, a tree or hierarchical network, and the like.

The combiner nodes 210 can coherently aggregate multiple data received from the ground receivers 204 and can generate a single coherent superposition of the multiple received data. The superposition of the multiple received data can then be demodulated in DD modules 220 to be converted into a format usable by end users as the UD stream 230. An important aspect of the subject technology is the capability of simultaneous recovery of a multiplicity of UD streams 230 via a shared infrastructure (e.g., the ground receivers 204 and the network 205).

In some aspects, the data received by each of the combiner nodes 210 may be a single-source data stream or a multiple-source data stream, for example, n-source data stream associated with n different sources (e.g. ground receivers 204), communicated over the network 205. In some aspects, the RVG-MA system 200 may include additional network facilities between combiner nodes 210, DD modules 220 and UD streams 230, which are not shown for simplicity. For example, a network controller may coordinate transmission and/or receive times, sub-band tuning, data routing, the combiner nodes 210 and the DD modules 220 that would coherently combine sub-bands and produce the fully demodulated data stream. The coherent combining performed by the combiner nodes 210 can be utilized to decrease the required transmit power and/or antenna sizes of the satellites 202. It is noted that the aggregating of data by the combiner nodes 210 and demodulation of the data by the DD modules 220 are tuned to each UD stream. For example, each of the UD streams 230 (e.g., 230-1) can be associated with the downlink of a desired target satellite from the set of satellites 202 (e.g., 202-1).

Figure 3:
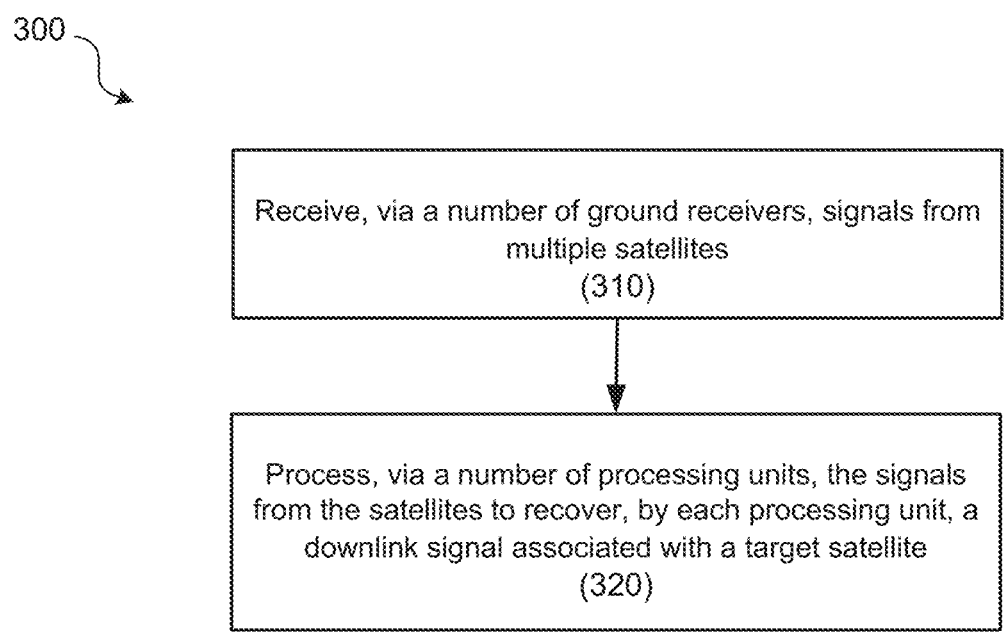
FIG. 3 is a flow diagram illustrating an example method of RVG-MA satellite communication, according to some aspects of the subject technology.

FIG. 3 is a flow diagram illustrating an example method 300 of RVG-MA satellite communication, according to some aspects of the subject technology. The method 300 includes receiving, via a number of ground receivers (e.g., 204 of FIG. 2), signals from multiple satellites (e.g., 202 of FIG. 2) (310). The method 300 further includes processing, via a number of processing units (e.g., 106 of FIG. 1 or 210 and 220 of FIG. 2), the signals from the satellites to recover, by each processing unit, a downlink signal associated with a target satellite (e.g., 202-1 of FIG. 2) (320). The ground receivers are scattered over a large geographic area (e.g., one or more countries of one or more continents or the entire Earth surface).

Figure 4:
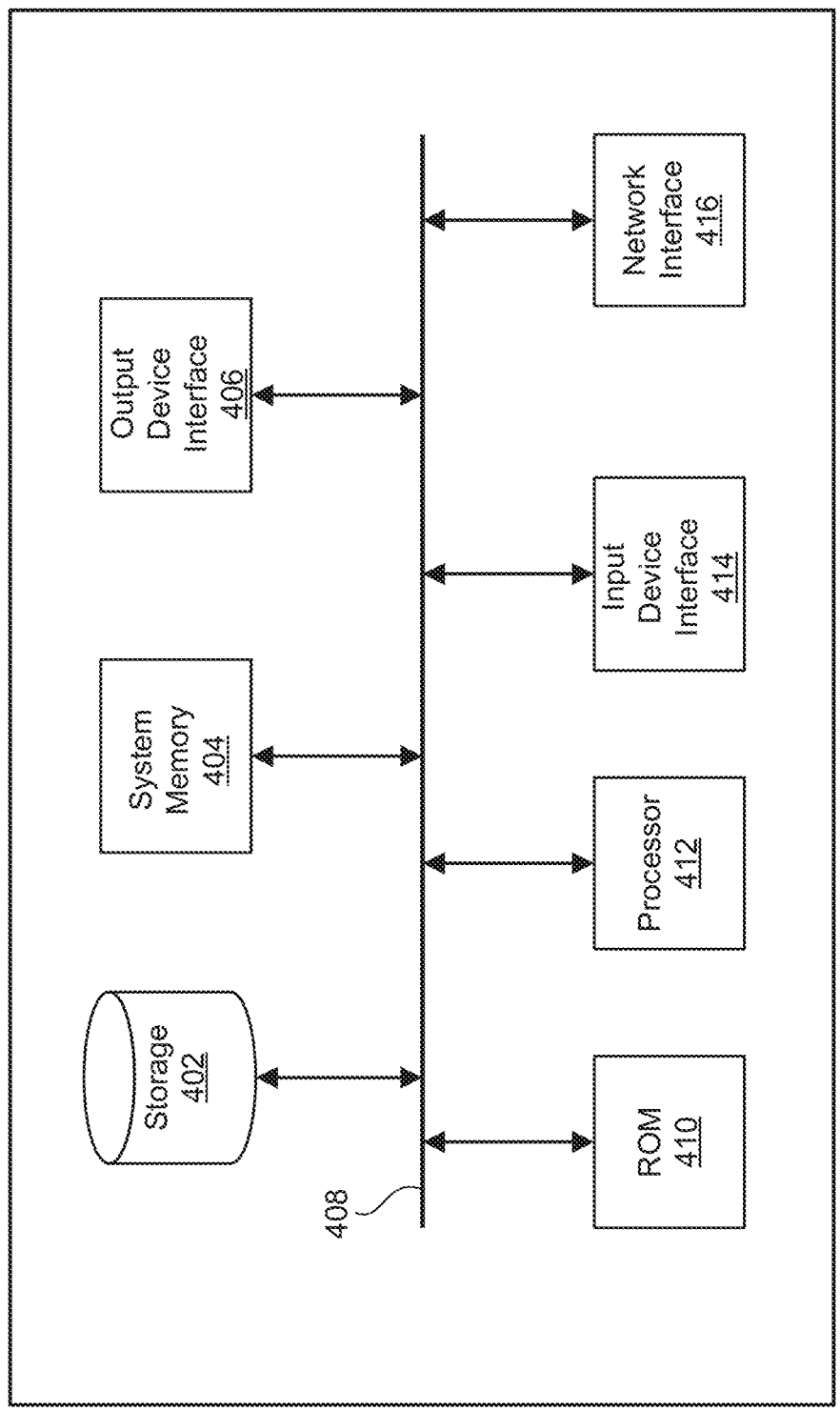
FIG. 4 is a block diagram conceptually illustrating an electronic system with which aspects of the subject technology are implemented.

FIG. 4 is a block diagram conceptually illustrating an electronic system 400 with which aspects of the subject technology are implemented. The electronic system 400, for example, can be a desktop computer, a laptop computer, a tablet computer, a server, a switch, a router, a base station, a receiver or generally any electronic device that has processing power and memory and communication capability, for example, the servers 106 of FIG. 1. Such an electronic system may include various types of computer-readable media and interfaces for various other types of computer-readable media. Electronic system 400 includes bus 408, processing unit(s) 412, system memory 404, read-only memory (ROM) 410, permanent storage device 402, input device interface 414, output device interface 406, and network interface 416, or subsets and variations thereof.

Bus 408 collectively represents all system, peripheral, and chipset buses that communicatively connect the numerous internal devices of electronic system 400. In one or more implementations, bus 408 communicatively connects processing unit(s) 412 with ROM 410, system memory 404, and permanent storage device 402. From these various memory units, processing unit(s) 412 retrieves instructions to execute and data to process in order to execute the processes of the subject disclosure. The processing unit(s) 412 can be a single processor or a multi-core processor in different implementations. In some aspects, the processing unit(s) 412 may perform the functionality of the processor unit of the subject technology, for example, the processor unit of the server 106 of FIG. 1.

ROM 410 stores static data and instructions that are needed by processing unit(s) 412 and other modules of the electronic system 400. Permanent storage device 402, on the other hand, is a read-and-write memory device. This device is a nonvolatile memory unit that stores instructions and data even when electronic system 400 is off. One or more implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as random access memory. System memory 404 stores any of the instructions and data that processing unit(s) 412 needs at runtime. In one or more implementations, the processes of the subject disclosure are stored in system memory 404, permanent storage device 402, and/or ROM 410. From these various memory units, processing unit(s) 412 retrieves instructions to execute and data to process in order to execute the processes of one or more implementations.

Bus 408 also connects to input and output device interfaces 414 and 406, respectively. Input device interface 414 enables a user to communicate information and select commands to the electronic system 400. Input devices used with input device interface 414 include, for example, alphanumeric keyboards and pointing devices (also called "cursor control devices"). Output device interface 406 enables, for example, the display of images generated by electronic system 400. Output devices used with output device interface 406 include, for example, printers and display devices, such as a liquid-crystal display (LCD), a light-emitting diode (LED) display, an organic light-emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 4, bus 408 also couples electronic system 400 to a network (not shown) through network interface 416. In this manner, the computer can be a part of a network of computers (such as a local area network (LAN), a wide area network (WAN), or an Intranet, or a network of networks, such as the Internet. Any or all components of electronic system 400 can be used in conjunction with the subject disclosure.

Many of the above-described features and applications may be implemented as software processes that are specified as a set of instructions recorded on a computer-readable storage medium (alternatively referred to as computer-readable media, machine-readable media, or machine-readable storage media). When these instructions are executed by one or more processing unit(s) (e.g., one or more processors, cores of processors, or other processing units), they cause the processing unit(s) to perform the actions indicated in the instructions. Examples of computer-readable media include, but are not limited to, RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards or micro-SD cards), magnetic and/or solid state hard drives, ultra-density optical discs, any other optical or magnetic media, and floppy disks. In one or more implementations, the computer readable media does not include carrier waves and electronic signals passing wirelessly or over wired connections, or any other ephemeral signals. For example, the computer-readable media may be entirely restricted to tangible, physical objects that store information in a form that is readable by a computer. In one or more implementations, the computer-readable media is nontransitory computer-readable media, computer-readable storage media, or nontransitory computer-readable storage media.

In one or more implementations, a computer-program product (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

While the above discussion primarily refers to microprocessor or multi-core processors that execute software, one or more implementations are performed by one or more integrated circuits, such as application-specific integrated circuits (ASICs) or field-programmable gate arrays (FPGAs). In one or more implementations, such integrated circuits execute instructions that are stored on the circuit itself.

In some aspects, RVG-MA of the subject technology supports multiple access by exploiting differences in relative motion between receivers and satellites, for example, RVG-MA can support demodulation of transmitted data from many satellites (e.g., 202 of FIG. 2) transmitting simultaneously within the same RF band/channel to a common set of receivers (e.g., 204 of FIG. 2).

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" mean displaying on an electronic device.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. All structural and functional equivalents to the elements of the various aspects described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

Although the invention has been described with reference to the disclosed aspects, one having ordinary skill in the art will readily appreciate that these aspects are only illustrative of the invention. It should be understood that various modifications can be made without departing from the spirit of the invention. The particular aspects disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative aspects disclosed above may be altered, combined, or modified and all such variations are considered within the scope and spirit of the present invention. While compositions and methods are described in terms of "comprising," "containing," or "including" various components or steps, the compositions and methods can also "consist essentially of" or "consist of" the various components and operations. All numbers and ranges disclosed above can vary by some amount. Whenever a numerical range with a lower limit and an upper limit is disclosed, any number and any subrange falling within the broader range are specifically disclosed. Also, the terms in the claims have their plain, ordinary meaning unless otherwise explicitly and clearly defined by the patentee. If there is any conflict in the usages of a word or term in this specification and one or more patent or other documents that may be incorporated herein by reference, the definitions that are consistent with this specification should be adopted.

What is claimed is:

1. A resilient virtual ground multiple-access (RVG-MA) satellite communication system, the system comprising:
   a plurality of ground receivers in communication with a plurality of satellites; and
   a plurality of processing units in communication with the plurality of ground receivers, each processing unit of the plurality of processing units being configured to recover a downlink signal from a target satellite of the plurality of satellite,
   wherein:
   each ground receiver of the plurality of ground receivers includes a small-aperture antenna and is configured to receive downlink signals associated with multiple satellites of the plurality of satellites, and
   the plurality of ground receivers are distributed in a large geographic area.

2. The system of claim 1, wherein each processing unit of the plurality of processing units includes a combiner module and a data demodulator module.

3. The system of claim 2, wherein the combiner module is configured to aggregate the downlink signals associated with the multiple satellites of the plurality of satellites and to generate an aggregated downlink signal.

4. The system of claim 3, wherein the data demodulator module is configured to demodulate the aggregated downlink signal and to recover the downlink signal associated with the target satellite of the plurality of satellites.

5. The system of claim 1, wherein a count of the plurality of ground receivers is more than a few thousands and the large geographic area comprises one or more countries.

6. The system of claim 1, wherein each processing unit of the plurality of processing units supports a number of end users by providing each end user with the downlink signal associated with the target satellite of the plurality of satellites.

7. The system of claim 1, wherein an aperture size of the small-aperture antenna is within a range of 10 cm-200 cm.

8. The system of claim 1, wherein the plurality of ground receivers are communicatively coupled to the plurality of processing units via a network.

9. The system of claim 8, wherein the network comprises a wideband internet cloud.

10. A method of satellite communication, the method comprising:
    receiving, via a plurality of ground receivers, signals from a plurality of satellites of multiple satellites; and
    processing, via a plurality of processing units, the signals from the plurality of satellites to recover, by each processing unit of the plurality of processing units, a downlink signal associated with a target satellite of the plurality of satellites,
    wherein the plurality of ground receivers are scattered over a large geographic area, and wherein each ground receiver of the plurality of ground receivers includes a small-aperture antenna having an aperture size less than a few meters.

11. The method of claim 10, wherein processing the signals from the plurality of satellites comprises aggregating downlink signals associated with the plurality of satellites to generate an aggregated downlink signal.

12. The method of claim 11, wherein processing the signals from the plurality of satellites further comprises demodulating the aggregated downlink signal and recovering the downlink signal associated with the target satellite of the plurality of satellites.

13. The method of claim 10, further comprising supporting via each processing unit of the plurality of processing units, a number of end users by providing each end user with the downlink signal associated with the target satellite of the plurality of satellites.

14. The method of claim 10, further comprising receiving signals, by the plurality of processing units, from the plurality of ground receivers, via a network.

15. The method of claim 14, wherein the network comprises at least one of a wideband internet cloud or the Internet.

16. The method of claim 10, wherein a count of the plurality of ground receivers is more than a few thousands and the large geographic area comprises one or more countries.

17. The method of claim 10, wherein the aperture size of the small-aperture antenna is within a range of 10 cm-200 cm.

18. A satellite communication system, comprising:
    a plurality of satellite transmitters configured to accumulate terrestrial data;
    a plurality of ground terminals, each ground terminal configured to receive downlink signals from multiple satellite transmitters of the plurality of satellite transmitters;
    a plurality of combiner nodes, each combiner node being configured to receive downlink signals from the plurality of ground terminals and to aggregate the received downlink signals; and
    a plurality of data demodulator nodes configured to recover downlink signals associated with a target satellite transmitter of the plurality of satellite transmitters; and
    a plurality of receivers in communication with a respective data demodulator node, each receiver configured to receive the downlink signals associated with the target satellite transmitter of the plurality of satellite transmitters from the respective data demodulator node.

19. The satellite communication system of claim 18, wherein the plurality of ground terminals comprise small-aperture antenna receivers, and wherein an aperture size of the small-aperture antenna is within a range of 10 cm-200 cm.

20. The satellite communication system of claim 18, wherein a count of the plurality of ground terminals is more than a few thousands, and wherein the plurality of ground terminals are scattered over a large geographic area including countries of one or more continents.

* * * * *